UNITED STATES PATENT OFFICE.

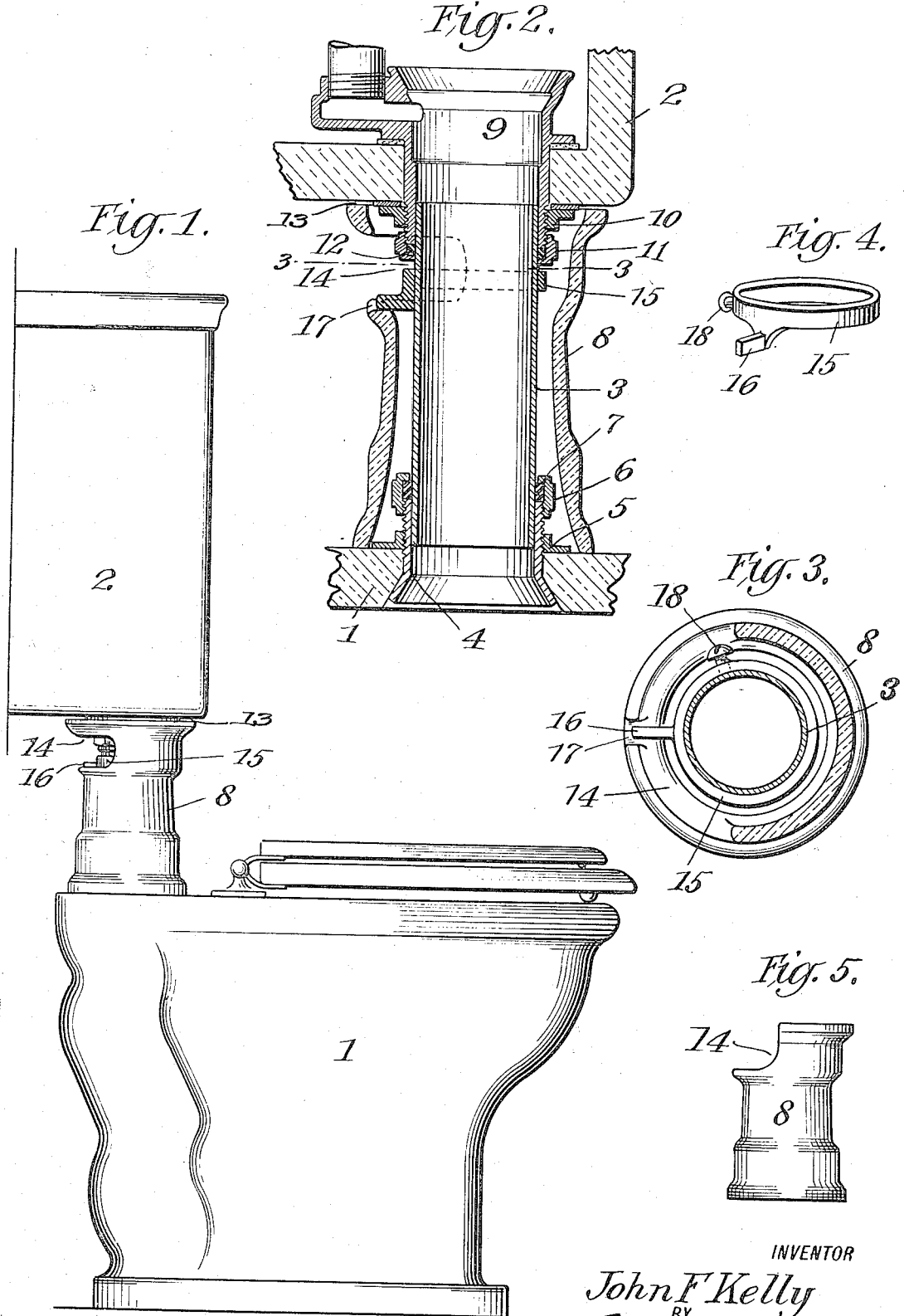

JOHN F. KELLY, OF TRENTON, NEW JERSEY, ASSIGNOR TO THOMAS MADDOCK'S SONS COMPANY, OF TRENTON, NEW JERSEY, A CORPORATION OF NEW JERSEY.

FLUSH-PIPE HOUSING.

1,195,685.   Specification of Letters Patent.   Patented Aug. 22, 1916.

Application filed June 8, 1915. Serial No. 32,805.

*To all whom it may concern:*

Be it known that I, JOHN F. KELLY, a citizen of the United States, and a resident of Trenton, in the county of Mercer and State of New Jersey, have invented certain new and useful Improvements in Flush-Pipe Housings, of which the following is a specification.

This invention relates to housings for covering flush pipe connections between water closet bowls and their flushing tanks.

The object of the invention is to enhance the appearance of a water closet installation, prevent the necessity of continually cleaning the flush pipe and its connections by concealing them and to avoid the expense of plating and polishing the pipe and its connections and with these objects in view it is the further object to provide a simple, inexpensive and practical housing which will meet the above requirements.

The invention consists in the improved pipe housing for water closet flush pipes hereinafter more particularly described and then specified in the claims.

In the accompanying drawings, Figure 1 illustrates in side elevation a water closet installation embodying my invention. Fig. 2 is an enlarged vertical cross-section through the flush pipe and its connections with the tank and closet bowl and the housing. Fig. 3 is a horizontal section taken on the line 3—3 Fig. 2. Fig. 4 is a detached perspective view of the preferred means to prevent turning of the housing around the flush pipe after installation. Fig. 5 is a side elevation of a slightly modified form of housing.

1 indicates the closet bowl and 2 the flushing tank therefor.

3 indicates the flush pipe through which the water is supplied from the tank 2 to the bowl 1. The pipe 3 is connected to the bowl 1 at its lower end by the usual bushing 4 and nut 5, an additional nut 6 being provided to compress a resilient washer 7 around the periphery of the pipe to make a water-tight joint.

8 indicates a housing of any desired contour loosely surrounding the pipe 3 and seating on the upper surface of the bowl 1. The housing 8 is preferably made of porcelain although it may if desired be made of metal, porcelain covered or enameled. After securing the pipe 3 to the bowl, the housing 8 is slipped over it and then the tank 2 with its usual attendant fittings is applied to the upper end of the pipe 3. These fittings comprise the usual bushing 9, the upper end of which serves as a valve seat for the usual flush valve of the tank and the lower end being threaded and provided with a nut 10 for clamping the bushing to the wall of the tank. The lower threaded end of the bushing 9 is also provided with a nut 11 and resilient washer 12 engaging the periphery of the pipe 3 and which loosely slips over the pipe when applying the tank thereto. Preferably when the tank is secured in position against the wall there is left a slight space 13 between the bottom of it and the top of the housing 8 to prevent the weight falling on the housing and also to allow variation for the plumber in making his installation.

After the tank has been secured in place it remains to tighten up the nut 11 to compress the washer 12 to make a water-tight joint. To effect this an opening or slot 14 is provided in the wall of the housing 8 at or near the top to permit the insertion of a wrench or tool and of such length around the periphery of the housing that there is ample room for operating the wrench. The opening 14 may be near the upper end of the housing as indicated in Figs. 1 and 2 so that a continuous bead is left at the end or it may be cut out all the way to the top as indicated in Fig. 5.

The opening 14 is disposed at the rear of the housing when the installation is completed and it is desirable to provide means to prevent it being turned around to expose the opening to view from the front. The preferred means for accomplishing this purpose comprise a ring 15 preferably slipped over the pipe 3 before placing the tank thereon and provided with a radially projecting finger 16 which engages in a groove 17 formed in the lower edge of the opening 14. A set screw 18 clamps the ring in place on the pipe 3, the finger or projection 16 being offset from the ring 15 to permit ready access to the set screw 18 through the opening 14.

What I claim as my invention is:—

1. The combination with a water closet bowl, a tank therefor and a flush pipe connecting said bowl and tank, of a one-piece housing loosely surrounding and concealing said flush pipe and having an opening in the side wall through which access may be had to said flush pipe and means associated with said flush pipe and adapted to prevent turning of the housing.

2. The combination with a water closet bowl, a tank therefor and a flush pipe connecting said bowl and tank, of a one-piece porcelain housing loosely surrounding said pipe and having an opening in the side wall through which access may be had to said pipe and projecting means secured to said pipe and adapted to engage said housing to prevent turning thereof.

3. The combination with a water closet bowl, a tank therefor and a flush pipe connecting said bowl and tank, of a one-piece porcelain housing surrounding said pipe and having an opening in the wall thereof through which access may be had to the pipe and a ring secured to said pipe and having a lug engaging a recess in an edge of said opening to prevent said housing turning.

Signed at Trenton, in the county of Mercer and State of New Jersey, this third day of June, A. D. 1915.

JOHN F. KELLY.

Witnesses:
WM. H. KELLY,
F. SPICER.